C. H. WILLIAMS, Jr.
THIRD POINT SUPPORT FOR BRAKE BEAMS.
APPLICATION FILED MAY 16, 1914.

1,126,329.

Patented Jan. 26, 1915.

Witnesses
Wm. Janus
W. P. Smith

Inventor
Charles H. Williams, Jr.
By F. K. Cornwall, Atty.

UNITED STATES PATENT OFFICE.

CHARLES H. WILLIAMS, JR., OF CHICAGO, ILLINOIS, ASSIGNOR TO CHICAGO RAILWAY EQUIPMENT COMPANY, OF CHICAGO, ILLINOIS, A CORPORATION OF ILLINOIS.

THIRD-POINT SUPPORT FOR BRAKE-BEAMS.

1,126,329. Specification of Letters Patent. Patented Jan. 26, 1915.

Continuation of application Serial No. 818,936, filed February 16, 1914. This application filed May 16, 1914. Serial No. 839,006.

*To all whom it may concern:*

Be it known that I, CHARLES H. WILLIAMS, Jr., a citizen of the United States, residing at Chicago, Illinois, have invented a certain new and useful Improvement in Third-Point Supports for Brake-Beams, of which the following is a full, clear, and exact description, such as will enable others skilled in the art to which it appertains to make and use the same, reference being had to the accompanying drawings, forming part of this specification, in which—

Figure 1:
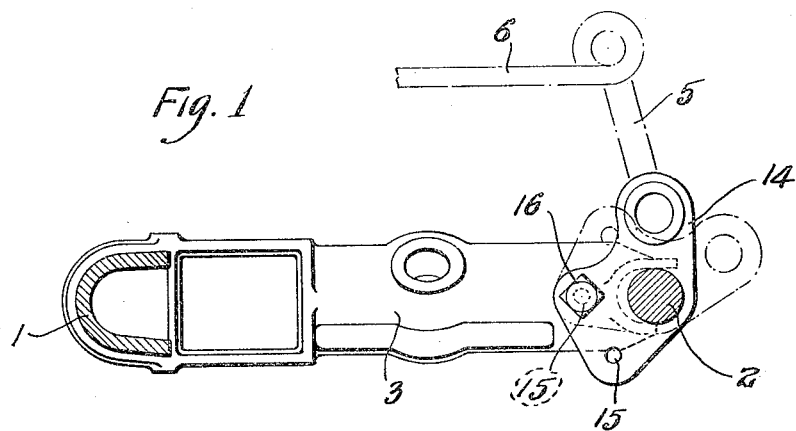
Figure 2:
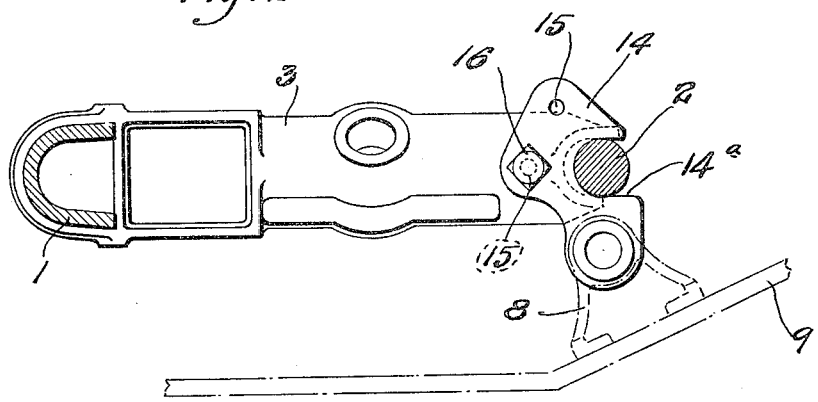

Figure 1 is a view of a brake beam strut showing my improved adjustable bracket containing third point supporting ears. Fig. 2 is a modified form.

My invention relates to a new and useful improvement in third point supports for brake beams, the object being to provide a brake beam strut with adjustable third point support suspension ears so located that they can properly support the beam.

In the drawings, 1 indicates the compression member, 2 the tension member, and 3 the strut.

14 is a third point attaching member mounted so as to swing upon the tension member 2, whereby it may be adjusted to different positions. It is provided with a plurality of holes 15 for coöperation with the bolt 16, whereby it is locked in adjusted position.

The third point suspending link 5 mounted on the end of a spring support 6 may be employed as shown in Fig. 1 where an overhead suspension is used or, as shown in Fig. 2, the member 14 may have an open ended slot 14ª to coöperate with the tension member 2, whereby the adjustable member may be removed and reversed and used with an underhung supporting shoe 8 which coöperates with the inclined end of a third point supporting spring 9.

This present application is a continuation of application serially numbered 818,936 filed by me February 16, 1914.

I claim:

1. In a third point support for brake beams, a brake beam having a strut in combination with an adjustable lug or ear to be used in connection with overhead or underhung third point supports and means for locking said adjustable lug or ear in position.

2. In a third point support for brake beams, a brake beam having a strut in combination with an adjustable lug or ear to be used in connection with overhead or underhung third point supports, and means for locking said adjustable lug or ear in adjusted position.

3. In a third point support for brake beams, the combination with a brake lever post of the brake beam, and a reversible member removably mounted on the end of said post, said member forming means of attachment for devices employed where the brake beam is used either with overhead or underhung brake beam suspension supports.

In testimony whereof I hereunto affix my signature in the presence of two witnesses, this eleventh day of May, 1914.

CHARLES H. WILLIAMS, JR.

Witnesses:
E. T. WALKER,
M. F. HUNTOON.

Copies of this patent may be obtained for five cents each, by addressing the "Commissioner of Patents, Washington, D. C."